United States Patent [19]

Yuen

[11] Patent Number: 4,621,670

[45] Date of Patent: Nov. 11, 1986

[54] DATE INDEXED FOOD STORAGE CONTAINER

[75] Inventor: Tony Yuen, San Francisco, Calif.

[73] Assignee: Lamarle, South San Francisco, Calif.

[21] Appl. No.: 716,643

[22] Filed: Mar. 27, 1985

[51] Int. Cl.$^4$ .............. A47J 47/02; B65D 43/02; G09F 9/00

[52] U.S. Cl. .............. 150/55; 116/308; 206/459; 215/1 C; 215/365; 220/66; 220/305

[58] Field of Search ............ 150/55; 215/1 C, 365, 215/230; 220/66, 305; 116/308; 206/459

[56] References Cited

U.S. PATENT DOCUMENTS

| Re. 24,889 | 10/1960 | Tupper | 150/55 |
|---|---|---|---|
| 153,529 | 7/1874 | Bennett . | |
| 169,992 | 11/1875 | Hawkins . | |
| D. 182,779 | 5/1958 | Tupper . | |
| 261,131 | 7/1882 | Bonshire . | |
| 558,503 | 4/1896 | Marbury | 220/66 X |
| 596,646 | 1/1898 | Altshul . | |
| 784,194 | 3/1905 | Victor | 215/230 |
| 2,121,165 | 6/1938 | Slobodkin | 220/66 |
| 2,201,524 | 9/1940 | Esty . | |
| 2,713,845 | 7/1955 | Silverman | 116/308 |
| 2,739,564 | 3/1956 | North | 116/308 |
| 2,752,970 | 7/1956 | Tupper | 150/55 |
| 2,765,831 | 10/1956 | Tupper | 150/55 |
| 2,765,832 | 10/1956 | Tupper | 150/55 |
| 2,768,667 | 10/1956 | Hill | 150/55 |
| 2,789,607 | 4/1957 | Tupper | 150/55 |
| 2,816,589 | 12/1957 | Tupper | 150/55 X |
| 3,097,058 | 7/1963 | Branscom et al. | 215/1 C |
| 3,678,884 | 7/1972 | Robbins | 116/308 |
| 3,818,858 | 6/1974 | Kramer et al. . | |
| 4,458,820 | 7/1984 | Abrams | 215/230 |
| 4,481,163 | 11/1984 | Ota et al. | 215/1 C X |
| 4,548,157 | 10/1985 | Hevoyan | 116/308 |

OTHER PUBLICATIONS

Tupperware Catalog 51,354 (1083) Tupperware Home Parties.
Tupperware Catalog 51,420 (784) Tupperware Home Parties.
Tupperware 1984 Catalog.

*Primary Examiner*—William Price
*Assistant Examiner*—Sue A. Weaver
*Attorney, Agent, or Firm*—Phillips, Moore, Lempio & Finley

[57] ABSTRACT

A food container particularly adopted for use in a home freezer, has a peripheral flange adjacent to the top of the lower portion. The flange is date indexed and extends outwardly so that when the top, which is equipped with a pointer, is fixed to the base the indicia on the flange is visible from generally above as the viewers' eyes are directed down toward the food container.

2 Claims, 3 Drawing Figures

U.S. Patent   Nov. 11, 1986   4,621,670
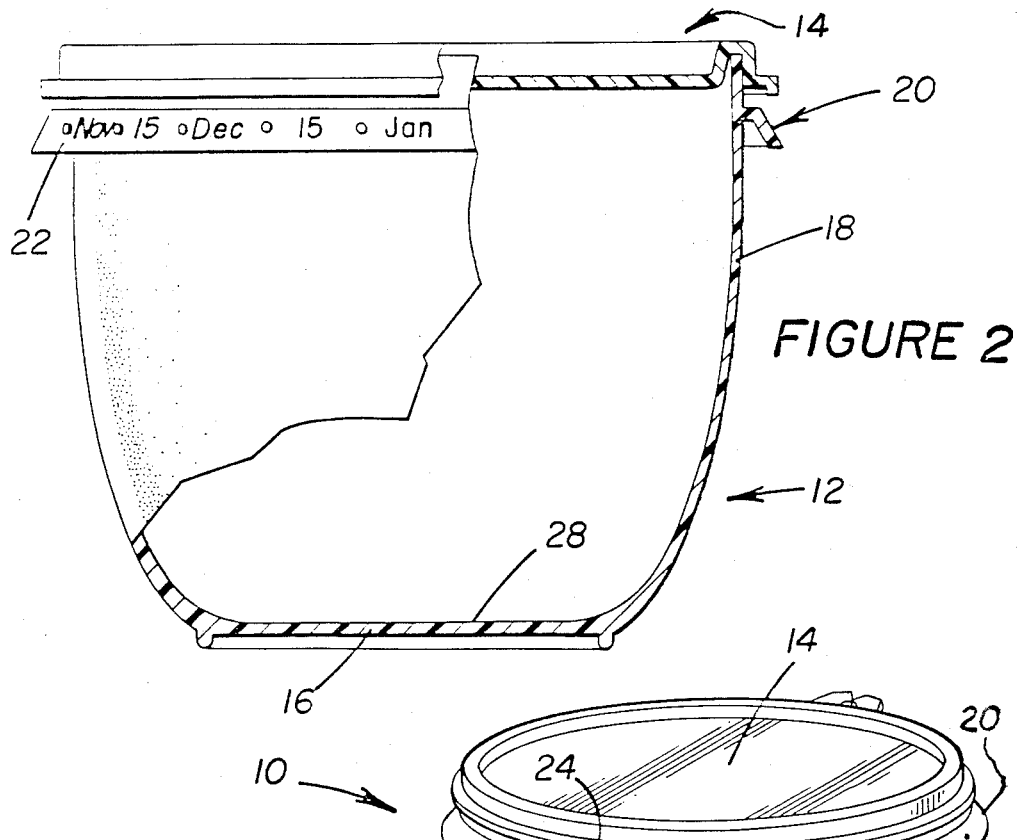
FIGURE 2
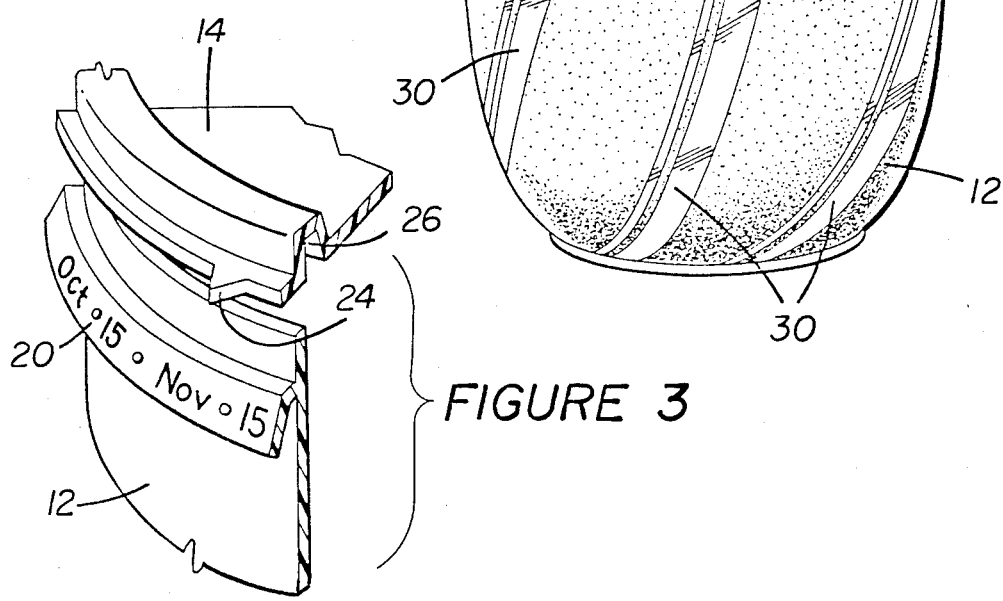
FIGURE 1
FIGURE 3

DATE INDEXED FOOD STORAGE CONTAINER

TECHNICAL FIELD

This invention relates to food storage containers, in particular an indexed food storage container that may be used in a home freezer.

BACKGROUND OF THE INVENTION

A food storage container that provides a relatively air tight seal with a snap-on tight cover relatively well known in the art. Usually these containers are made of one of the many plastic materials giving them a certain degree of flexibility. The nature of the plastic, however, usually results in opaque or almost opaque container such that the material stored in the container or the "fullness" of the container is not visible without removing the lid or cover. In some instances, a "window" has been left in the frosting to provide a view of the contents.

Attempts to indicate storage dates short of actual marking on the container have met with little commercial success probably for several reasons. Generally speaking the dating method is relatively complex and in at least one case required the addition of a paper strip or the like. In at least two other instances a dial type indicator was affixed to the side of the container so that a month could be indicated by the dial indicator while the day of the month was referenced by the lid being rotated to a particular index mark. A variation on this last device teaches placing a first indicia on the container, which may be the days of the week or the days of the month, while a second indicia is placed on the lid of the container. The second indicia would be the months of the year. The two indicia were so arranged that when the month was aligned with a particular day of the month the remaining months are displaced so that it was not possible to have two conflicting dates.

As can be seen the existing devices are rather complex. In the first instance, that of the dial, the dial can very easily be displaced by one or several months thereby losing its value. In the second instance, it is necessary to align the dates very carefully so that there would be no confusion between the positioning of the two indicia.

The present invention has as an object embodying a dating scheme in a food container such that the date is readily visible to the user and such that confusion between several dates is not present.

It is also an object of this invention to provide a food storage container that has at least a portion of the container constructed of substantially transparent material so that the user is aware of the contents of the container.

It is still a further object of the invention to provide a food storage container that has a continuously curved inner surface so that withdrawal of food products from the container is eased when a spoon is used.

SUMMARY OF THE INVENTION

The present invention is a date indexed food storage container which includes a base having a lower pedestal portion and an upstanding portion. The upstanding portion includes an outwardly extending flange adjacent the upper perimeter of the outstanding portion with the flange having formed there upon date indicia. A cover is included in the invention. The cover is non-rotatably fixable to the upstanding portion of the base such that an outwardly extending pointer affixed to the perimeter of the cover may be aligned with one of the indicia on the outwardly extending flange.

A BRIEF DESCRIPTION OF THE DRAWING

FIG. 1 is a perspective view of the food container that embodies the invention described herein.

FIG. 2 is an elevation view of the food container shown in FIG. 1 in which a portion has been removed to show the internal structure of the food container.

FIG. 3 is a detailed drawing of the upper portion of the food container shown in FIG. 2 with the indicia and pointer being visible.

DETAILED DESCRIPTION OF THE PREFERRED EMBODIMENT

Referring now to FIG. 1, a food container 10 is illustrated. Food storage container 10 consists of a base 12 and a cover 14. Base 12 has a lower pedestal portion 16 and an upstanding portion 18. Container 10 is preferably made of plastic material.

Upstanding portion 18 has formed around and adjacent to the upper perimeter an outwardly extending flange 20. Flange 20 is formed so that there is a generally downwardly directed surface 22 that runs about the perimeter in the manner shown in FIG. 2. This downwardly directed surface has formed thereupon date indicia such as the month of the year, with for example an indication of the midpoint of each month, such as the numeral 15 as shown in FIG. 2. The numeral 15 shown between DEC and JAN in FIG. 2 would indicate mid-December. The downward directed surface 22 is positioned in a manner so that a user of the food storage container can read the month when looking at the container in an elevational position such as shown in FIG. 2. The user can also see substantial portions of the date from above so that when the container is located in a top opening home freezer it is not necessary to completely remove the container from the freezer to see the date. It should be noted that the container may have to be tilted or leaned to a certain extent to get a clear view of the date.

Associated with the indicia just described, is a pointer 24 that is integrally formed with cover 14 (see FIG. 3). This pointer may take any convenient form however in the preferred embodiment the pointer is a triangular projection in the perimeter portion of the cover. Cover 14 is fixable to base 12 by means of a groove 26 formed in the cover. Cover 14 with groove 26 is formed so that when the cover 14 is put in position on the base 12 as shown in FIGS. 1 and 2, the cover is non-rotatable. This is accomplished by making the outside diameter of the upstanding portion 18 slightly larger than the inside diameter of the outer edge of groove 26. One purpose of making the cover non-rotatable is that when the cover is installed on the base 12 it will not be displaced by rough handling in the freezer. It should also be understood that the cover serves to seal the container.

Referring now to FIG. 2, the inner surface 28 of base 12 may be described in mathematical terms as having a continuous curve. What is meant by the continuous curve is that there are no discontinuities in the inner surface that can impede the removal of food or the like from the container. In a container having a round cross-section as depicted in FIG. 1, this inner surface 28 can also be described as a surface of revolution.

Referring now to FIG. 1, the base portion 12 includes at least portions that are substantially transparent. These are apparent in the upward swirling design as indicated at 30 in FIG. 1. The purpose of leaving a relatively transparent area on the container wall is so that the user can determine either the contents or the amount contained in the container by looking "through the side." In the particular embodiment depicted in FIG. 1 the remaining portions of the side are frosted. This frosting can be used for writing with a lead pencil or the like should the user so desire. It is pointed out that the particular design shown in FIG. 1 while aesthetically pleasing is not functional. The functional feature of transparency can be accomplished by making the entire container transparent or making vertical sections of the container transparent so that the amount of material can be determined inside the container and also the character of the content.

APPLICATION

It should be apparent to those skilled in the art how the container would be utilized. However the following comments are offered to ease such an analysis.

The container is particularly adaptable for use in a home freezer wherein the contents are placed within the base portion 12 in the usual manner. The cover 14 is then positioned on the base portion 12 so that pointer 24 is either directed toward the date of storage or directed toward a "discard" date. The non-rotatability of the cover when it is fixed to the upstanding portion 18 insures that the date will not be changed by "jogging" against other containers in the freezer. The downwardly but outwardly directed surface 22 provides visibility both horizontally and vertically to the user. Should the pointer 24 be positioned toward the rear in an upright type freezer then rotation of the container may be accomplished without displacing the positioning of the cover, so that the date may be read.

It should be apparent to those skilled in the art that while, this container has a circular cross-section, the invention is applicable to other shaped containers such as containers with oval cross-sections or square cross-sections. In the square or oblong cross-sectioned containers the inner surface of the container, in order to meet the inventive concept of a continuous curve, should have curved surfaces without discontinuities such as surface 28 depicted in FIG. 2.

This invention is limited only to the extent of the claims appended hereto.

What is claimed:

1. A date indexed food storage container comprising:
   a base having a lower pedestal portion and an upstanding portion, said upstanding portion having an outwardly extending and downwardly angled flange adjacent to and integral with the upper perimeter of the upstanding portion, said flange having formed on the downwardly angled portion date indicia, said upstanding portion further having a substantially transparent area extending from the lower pedestal portion to the flange and having at least one frosted surface capable of being written upon with a lead pencil; and
   a cover, said cover having a perimeter and said cover further being non-rotatably fixable to said upstanding portion, said cover having an outwardly extending pointer on the perimeter thereon said cover fixable to said upstanding portion so that said indicia on the flange is generally readable from above perpendicularly and horizontally to said cover.
2. The food container of claim 1 wherein the lower pedestal portion and the upstanding portion are joined to form an interior surface having a continuous curve.

* * * * *